United States Patent
Kaufhold

(10) Patent No.: US 7,149,335 B2
(45) Date of Patent: Dec. 12, 2006

(54) METHOD AND APPARATUS FOR ENHANCING AN IMAGE

(75) Inventor: John Patrick Kaufhold, Altamont, NY (US)

(73) Assignee: General Electric Company, Niskayuna, NY (US)

(*) Notice: Subject to any disclaimer, the term of this patent is extended or adjusted under 35 U.S.C. 154(b) by 695 days.

(21) Appl. No.: 10/256,779

(22) Filed: Sep. 27, 2002

(65) Prior Publication Data

US 2004/0062429 A1  Apr. 1, 2004

(51) Int. Cl.
*G06K 9/00* (2006.01)

(52) U.S. Cl. ....................... 382/132; 382/254

(58) Field of Classification Search ........ 382/128–134, 382/189, 214, 266, 254, 263; 600/4, 440, 600/449, 458, 463; 378/2, 4, 46, 63, 90, 378/92, 98, 98.4, 98.6, 98.11, 98.12, 101, 378/140

See application file for complete search history.

(56) References Cited

U.S. PATENT DOCUMENTS

| 5,440,647 A | * | 8/1995 | Floyd et al. ............. 382/132 |
| 5,644,612 A | * | 7/1997 | Moorman et al. ......... 378/98.2 |
| 5,712,890 A | * | 1/1998 | Spivey et al. ............. 378/37 |
| 5,740,268 A | | 4/1998 | Nishikawa et al. |
| 5,872,828 A | * | 2/1999 | Niklason et al. ............ 378/23 |
| 5,892,808 A | * | 4/1999 | Goulding et al. ............ 378/63 |
| 5,999,639 A | | 12/1999 | Rogers et al. |
| 6,047,090 A | * | 4/2000 | Makram-Ebeid ............ 382/257 |
| 6,137,898 A | | 10/2000 | Broussard et al. |
| 6,198,838 B1 | * | 3/2001 | Roehrig et al. ............. 382/132 |
| 6,205,236 B1 | | 3/2001 | Rogers et al. |
| 6,226,350 B1 | * | 5/2001 | Hsieh .................... 378/98 |
| 6,434,262 B1 | | 8/2002 | Wang |
| 6,639,964 B1 | * | 10/2003 | Schneider et al. ............ 378/7 |

* cited by examiner

*Primary Examiner*—Jingge Wu
*Assistant Examiner*—Abolfazl Tabatabai
(74) *Attorney, Agent, or Firm*—Fletcher Yoder

(57) ABSTRACT

A method for facilitating an enhancement of a visibility of an object in an x-ray image includes generating an x-ray image including at least one object, generating an estimate of a background surrounding the at least one object, subtracting the background estimate from the x-ray image to generate an estimate of pixel intensities due the object, mapping the estimate of pixel intensities due to the object, and combining the mapped estimate of pixel intensities due to the object and the x-ray image to generate an enhanced image.

30 Claims, 6 Drawing Sheets

METHOD AND APPARATUS FOR ENHANCING AN IMAGE

STATEMENT REGARDING FEDERALLY SPONSORED RESEARCH & DEVELOPMENT

The government may have rights in this invention pursuant to Subcontract 22287 issued from the Office of Naval Research/Henry M. Jackson Foundation.

BACKGROUND OF THE INVENTION

This invention relates generally to an imaging system, and more particularly, to methods and apparatus for enhancing an image using a medical imaging system.

Detecting microcalcifications is important because they are often the only pathology indicators in mammography revealing cancer on a mammogram at a stage when the disease is still curable. For example, microcalcifications are currently used to detect over 50% of non-palpable disease on mammograms. However, some microcalcifications are relatively small and can be virtually imperceptible to the human eye even after the display settings for the image have been adjusted to improve visualization of the pathology.

BRIEF DESCRIPTION OF THE INVENTION

In one aspect, a method for facilitating an enhancement of a visibility of an object in an x-ray image is provided. The method includes generating an x-ray image including at least one object, generating an estimate of a background surrounding the at least one object, subtracting the background estimate from the x-ray image to generate an estimate of pixel intensities due the object, mapping the estimate of pixel intensities due to the object, and combining the mapped estimate of pixel intensities due to the object and the x-ray image to generate an enhanced image.

In another aspect, a medical imaging system for facilitating an enhancement of a visibility of an object in an x-ray image is provided. The medical imaging system includes a detector array, at least one radiation source, and a computer coupled to the detector array and the radiation source. The computer is configured to generate an x-ray image including at least one object, generate an estimate of a background surrounding the at least one object, subtract the background estimate from the x-ray image to generate an estimate of pixel intensities due the object, map the estimate of pixel intensities due to the object, and combine the mapped estimate of pixel intensities due to the object and the x-ray image to generate an enhanced image.

In a further aspect, a computer readable medium encoded with a program executable by a computer for facilitating an enhancement of a visibility of an object in an x-ray image is provided. The program is configured to instruct the computer to generate an x-ray image including at least one object, generate an estimate of a background surrounding the at least one object, subtract the background estimate from the x-ray image to generate an estimate of pixel intensities due to the object, map the estimate of pixel intensities due to the object, and combine the mapped estimate of pixel intensities due to the object and the x-ray image to generate an enhanced image.

DETAILED DESCRIPTION OF THE INVENTION

Figure 1:
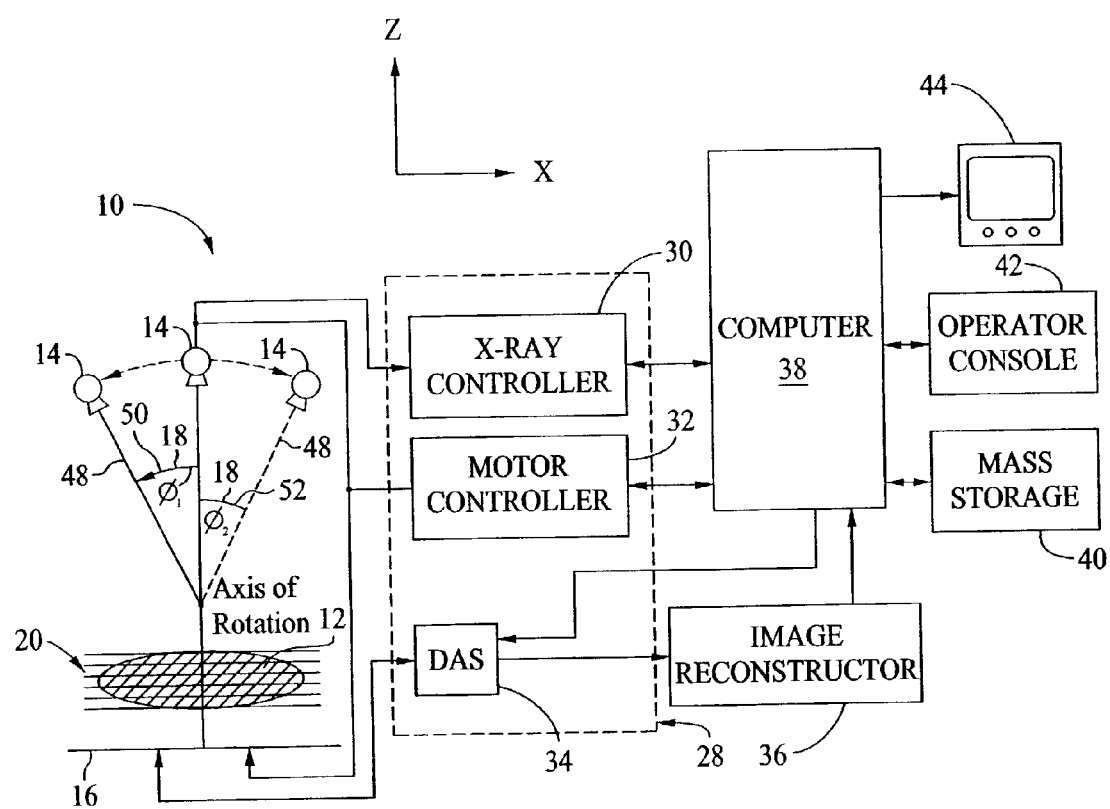
FIG. 1 is a pictorial view of a medical imaging system

Referring to FIG. 1 and in an exemplary embodiment, a medical imaging system 10 generates a three-dimensional dataset representative of an imaged object 12, such as a patient's breast 12 in mammographic tomosynthesis. System 10 includes a radiation source 14, such as an x-ray source 14, and at least one detector array 16 for collecting views from a plurality of projection angles 18. Specifically, and in one embodiment, system 10 includes a radiation source 14 which projects a cone-shaped beam of x-rays which pass through object 12 and impinge on detector array 16. The views obtained at each angle 18 can be used to reconstruct a plurality of slices, i.e., images representative of structures located in planes 20 parallel to detector 16. Detector array 16 is fabricated in a panel configuration having a plurality of pixels (not shown) arranged in rows and columns so that an image is generated for an entire object of interest such as breast 12. In one embodiment, detector array 16 is a mammographic detector array 16 and object 12 is a breast 12. Each pixel includes a photosensor, such as a photodiode, that is coupled via a switching transistor to two separate address lines, a scan line and a data line. The radiation incident on a scintillator material and the pixel photosensors measure, by way of change in the charge across the diode, the amount of light generated by x-ray interaction with the scintillator. As a result, each pixel produces an electronic signal that represents the intensity, after attenuation by object 12, of an x-ray beam impinging on detector array 16. In one embodiment, detector array 16 is approximately 20 cm by 20 cm and is configured to produce views for an entire object of interest, e.g., breast 12. Alternatively, detector array 16 is variably sized depending on the intended use. Additionally, the individual pixels on detector array 16 can also be any size depending on the intended use.

In one embodiment, the reconstructed three-dimensional dataset is not arranged in slices corresponding to planes that are parallel to detector 16, but in a more general fashion. In another embodiment, the reconstructed dataset includes a single two-dimensional image, or a single one-dimensional function. In one embodiment, the dataset is one of the images produced by standard x-ray mammography.

In one embodiment, radiation source 14 and detector array 16 are moveable relative to object 12 and each other. More specifically, radiation source 14 and detector array 16 are translatable so that the projection angle 18 of the imaged volume is altered. Radiation source 14 and detector array 16 are translatable such that projection angle 18 may be any acute or oblique projection angle.

The operation of radiation source 14 is governed by a control mechanism 28 of imaging system 10. Control mechanism 28 includes a radiation controller 30 that provides power and timing signals to radiation source 14 and a motor controller 32 that controls the respective translation speed and position of radiation source 14 and detector array 16. A data acquisition system (DAS) 34 in control mechanism 28 samples digital data from detector 16 for subsequent processing. An image reconstructor 36 receives sampled and digitized projection dataset from DAS 34 and performs high-speed image reconstruction, as described herein. The reconstructed three-dimensional dataset, representative of imaged object 12, is applied as an input to a computer 38 which stores the three-dimensional dataset in a mass storage device 40. Image reconstructor 36 is programmed to perform functions described herein, and, as used herein, the term image reconstructor refers to computers, processors, microcontrollers, microcomputers, programmable logic controllers, application specific integrated circuits, field programmable gate arrays (FPGA) and other programmable circuits.

Computer 38 also receives commands and scanning parameters from an operator via console 42 that has an input device. A display 44, such as a cathode ray tube and a liquid crystal display (LCD) allows the operator to observe the reconstructed three-dimensional dataset and other data from computer 38. The operator supplied commands and parameters are used by computer 38 to provide control signals and information to DAS 34, motor controller 32, and radiation controller 30.

In use, a patient is positioned so that the object of interest 12 is within the field of view of system 10, i.e., breast 12 is positioned within the imaged volume extending between radiation source 14 and detector array 16. Views of breast 12, are then acquired from at least two projection angles 18 to generate a projection dataset of the volume of interest. The plurality of views represent the tomosynthesis projection dataset. The collected projection dataset is then utilized to generate a three-dimensional dataset, i.e., a plurality of slices for scanned breast 12, representative of the three-dimensional radiographic representation of imaged breast 12. After enabling radiation source 14 so that the radiation beam is emitted at first projection angle 50, a view is collected using detector array 16. Projection angle 18 of system 10 is then altered by translating the position of source 14 so that central axis 48 of the radiation beam is altered to a second projection angle 52 and position of detector array 16 is altered so that breast 12 remains within the field of view of system 10. Radiation source 14 is again enabled and a view is collected for second projection angle 52. The same procedure is then repeated for any number of subsequent projection angles 18.

Figure 2:
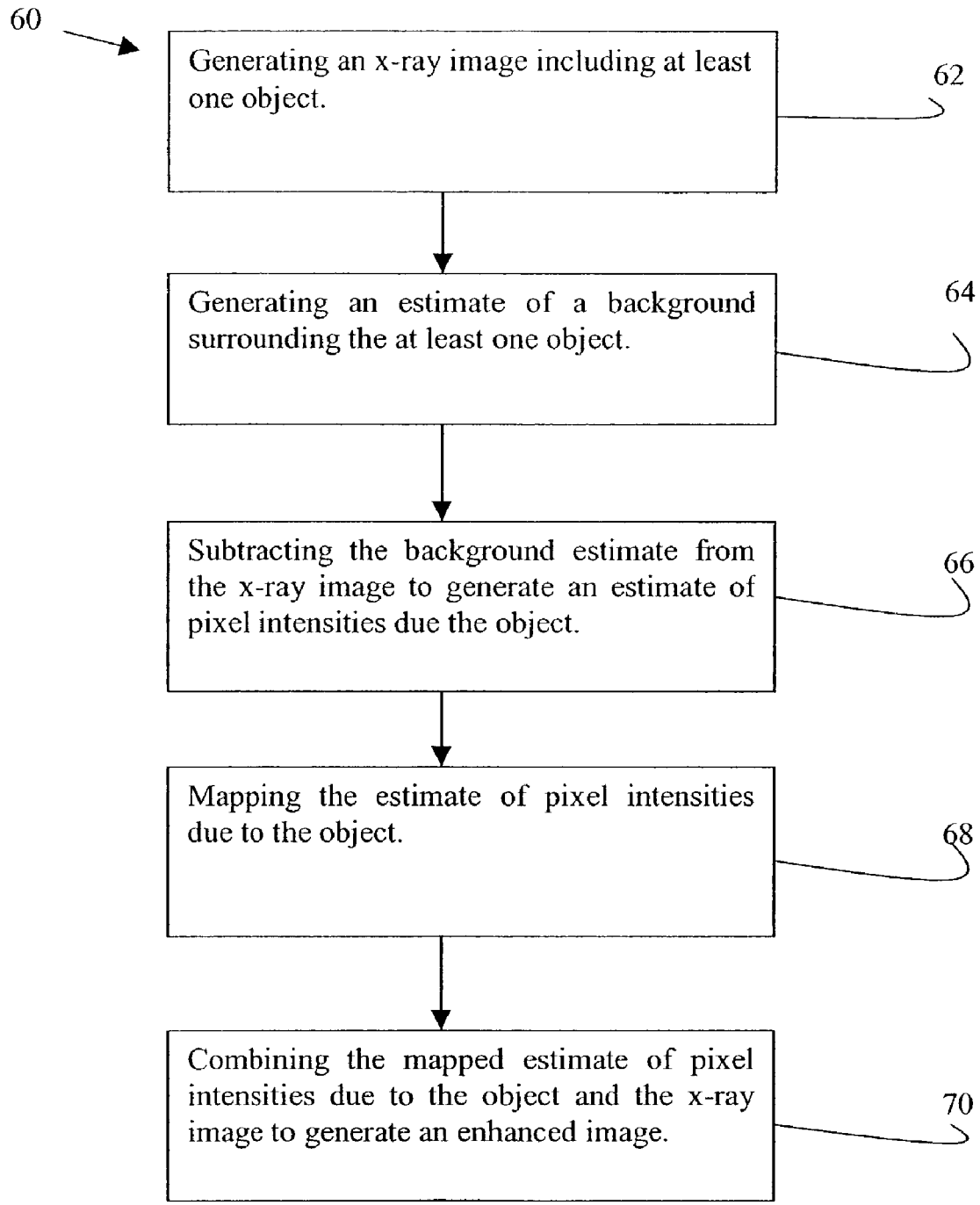
FIG. 2 is a method for enhancing a visibility of an object.

FIG. 2 is a method 60 for enhancing the visibility of an object 61 in an x-ray image. In the exemplary embodiment, method 60 includes generating 62 an x-ray image of at least one object 61 (shown in FIG. 3), generating 64 an estimate of a background surrounding the at least one object 61, subtracting 66 the background estimate from the x-ray image to generate an estimate of pixel intensities due the object 61, mapping 68 the estimate of pixel intensities due to object 61, and combining 70 the mapped estimate of pixel intensities due to object 61 and the x-ray image to generate an enhanced image. In an exemplary embodiment, object 61 is a microcalcification and the background surrounding object 61 is a portion of breast 12. For example, projections are similar to a standard mammogram with all the tissue positioned between source 14 and detector 16 contributing to the image. Accordingly, raw tomosynthesis datasets are composed of a number of projections. This set of projections is then used to reconstruct a volume, which is composed of a plurality of slices which are conceptually due to some of the tissue between source 14 and detector 16. Therefore, the methods described herein can be used on any constituent projection of the tomosynthesis dataset, for any one of the slices of the volume, or a hybrid of the two.

Accordingly, the methods described herein can be used in digitized film screen imagery, digital mammographic imagery, i.e. full field digital mammography (FFDM). In one embodiment, FFDM includes a direct detector system that converts x-rays directly to a charge which becomes a pixel intensity. In another embodiment, FFDM includes an indirect detector system that converts x-rays to light, called scintillation, the light is then converted to a charge which becomes a pixel intensity.

In an exemplary embodiment, generating 62 a normalized x-ray image includes generating at least one of a digital mammographic image and (or?) a digitized film mammographic image. The mammographic image is normalized such that the image intensity values are proportional to an integrated attenuation coefficient-thickness product of a pathlength traveled by an x-ray. The attenuation coefficient thickness product characterizes a total amount of x-ray beam attenuation from radiation source 14 to detector array 16. After the image has been normalized, a plurality of microcalcifications 61 ($\mu_{MC}$) appear as localized bright peaks on the image. In one embodiment, each image pixel $G(i, j)$ on detector 16, can be expressed as:

$$G(i, j) = \int_{pathlength} \int_{energy} \mu(x, y, z, E) \, dE \, dp \qquad \text{Equation 1}$$

where:

$\mu(x, y, z, E)$ is an x-ray energy-dependent attenuation coefficient of breast 12 at each position in breast 12.

Figure 3:
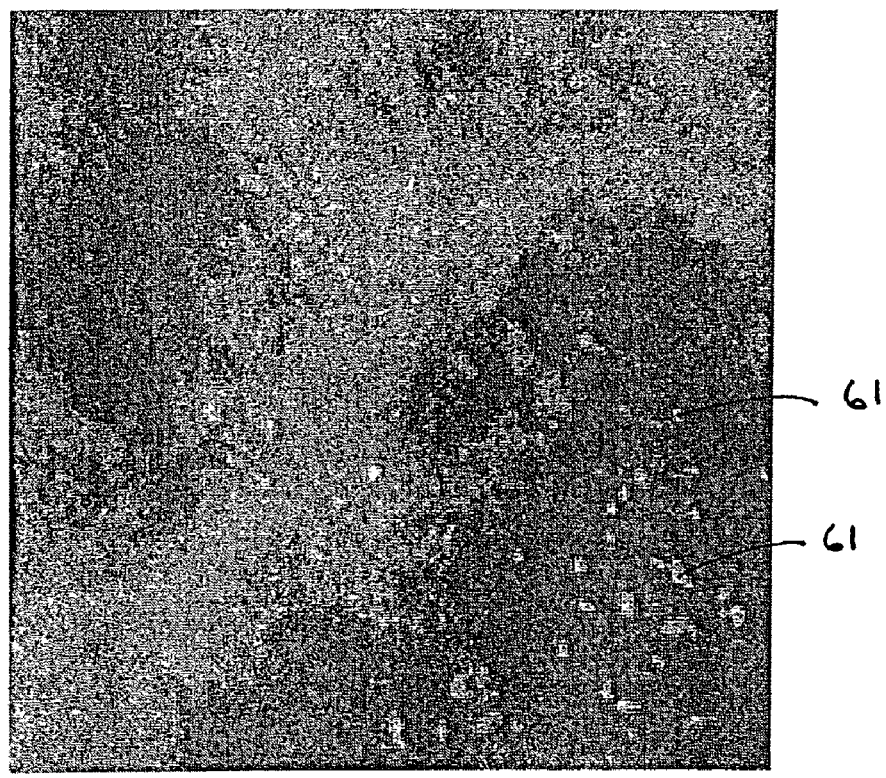
FIG. 3 is a mastectomy specimen including a plurality of microcalcifications.

The integral over energy (dE) describes a pixel intensity generated by a poly-energetic spectrum of x-rays, and the integral over pathlength (dp) describes a trajectory of a plurality of individual rays of the x-ray beam to a pixel location. In an exemplary embodiment, the attenuation coefficients $\mu(x, y, z, E)$ span a wide range that includes attenuation due to fibroglandular-equivalent tissue, fatty tissue, and a plurality of calcium salts. FIG. 3 illustrates a portion of a mastectomy specimen image wherein microcalcifications 61 appear as small bright spots. FIG. 3 has been normalized such that a brightness of each pixel behaves according to the model in Equation 1.

In use, the attenuation coefficient $\mu(x, y, z, E)$ of a typical microcalcification is approximately 25 times greater than a second-most attenuating material in breast 12. The large attenuation coefficient results in a plurality of locally bright pixels, that correspond to x-rays passing through microcalcification 61, to appear in the image. This local brightness is observed despite a relatively short pathlength through microcalcification 61 compared to the pathlength through breast 12.

Method 60 also includes decomposing the x-ray image into at least two separate images, such as, but not limited to, a first image A and a second image B. In an exemplary embodiment, the first image A represents the contributions to pixel intensity from each of the microcalcifications, and the second image B represents the contributions to pixel intensity from the background breast tissue.

In one embodiment, the x-ray image can be decomposed in accordance with:

$$G(i, j) = \underbrace{\int_{pathlength} \int_{-MC\ energy} \mu_{MC}(x, y, z, E) dE dp}_{A} + \underbrace{\int_{pathlength} \int_{-breast\ energy} \mu_{breast}(x, y, z, E) dE dp}_{B} \quad \text{Eq. 2}$$

where:

$$A(i, j) = \int_{pathlength} \int_{-MC\ energy} \mu_{MC}(x, y, z, E) dE dp$$

represents the contributions to pixel intensity from each microcalcification 61; and $$B(i, j) = \int_{pathlength} \int_{-breast\ energy} \mu_{breast}(x, y, z, E) dE dp$$

represents the contributions to pixel intensity from the background breast tissue.

For example, in Equation 2, the contribution of pixel intensity G(i, j) due to the A(i, j) term is from microcalcification 61 and the contribution of pixel intensity due to the B(i, j) term is from the remaining breast tissue along the same pathlength.

In use, the contribution of B(i, j) to G(i, j) is slowly varying in a small region around each microcalcification 61, therefore, in an exemplary embodiment, subtracting 66 the background estimate from the x-ray image to generate an estimate of pixel intensities due microcalcification 61 includes subtracting the background estimate B(i, j) from G(i, j) to generate an estimate of A(i, j), i.e. an estimate of the contributions to pixel intensity from each microcalcification 61. In one embodiment, a statistical algorithm, such as, but not limited to, a local and robust statistic for the background, which reduces the impact of outliers, can be used to estimate B(i, j). Outlier, as used herein, describes any value, reading, or measurement that is far outside established limits or a central range of the data and, for this reason, is questionable or considered to be due to some object or process which is not background. In one embodiment, a plurality of estimates, such as, but not limited to, a local mean estimate or a local median estimate in a patch of G about (i, j) can used to estimate the local background of breast tissue.

Therefore, in an exemplary embodiment, the excess intensity due to microcalcifications 61 can be estimated according to:

$$A(i, j) = G(i, j) - B(i, j) \quad \text{Equation 3}$$

where B(i, j) is an estimate of the local background breast tissue. In this example, the local median about (i, j) is used to estimate the background, B(i, j). In regions where there are microcalcifications 61, the excess intensity, A(i, j), is typically large and positive.

Figure 4:
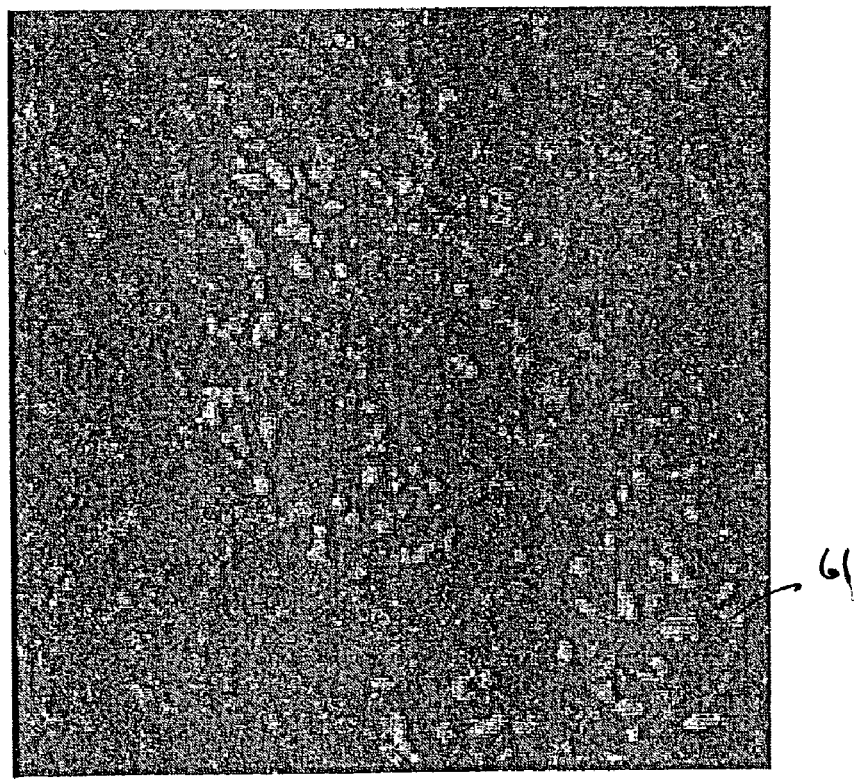
FIG. 4 is a mastectomy specimen with a local median intensity removed.

FIG. 4 illustrates the mastectomy specimen shown in FIG. 3 with the local median removed. In an exemplary embodiment, a local neighborhood, such as, but not limited to, a 7×7 pixel neighborhood, is used to generate the local median-subtracted image shown in FIG. 4. In another exemplary embodiment, the neighborhood is variably selected depending on the pixel pitch and specific imaging size parameters. For example, if the breast pixels do not include microcalcifications 61, the excess intensities A(i, j) are generally distributed unimodally about zero, fluctuating due to the natural intensity variation of a projection of breast tissue on detector 16. In an exemplary embodiment, the background breast pixels generally account for a majority of pixel intensities in the histogram of any particular patch.

Figure 5:
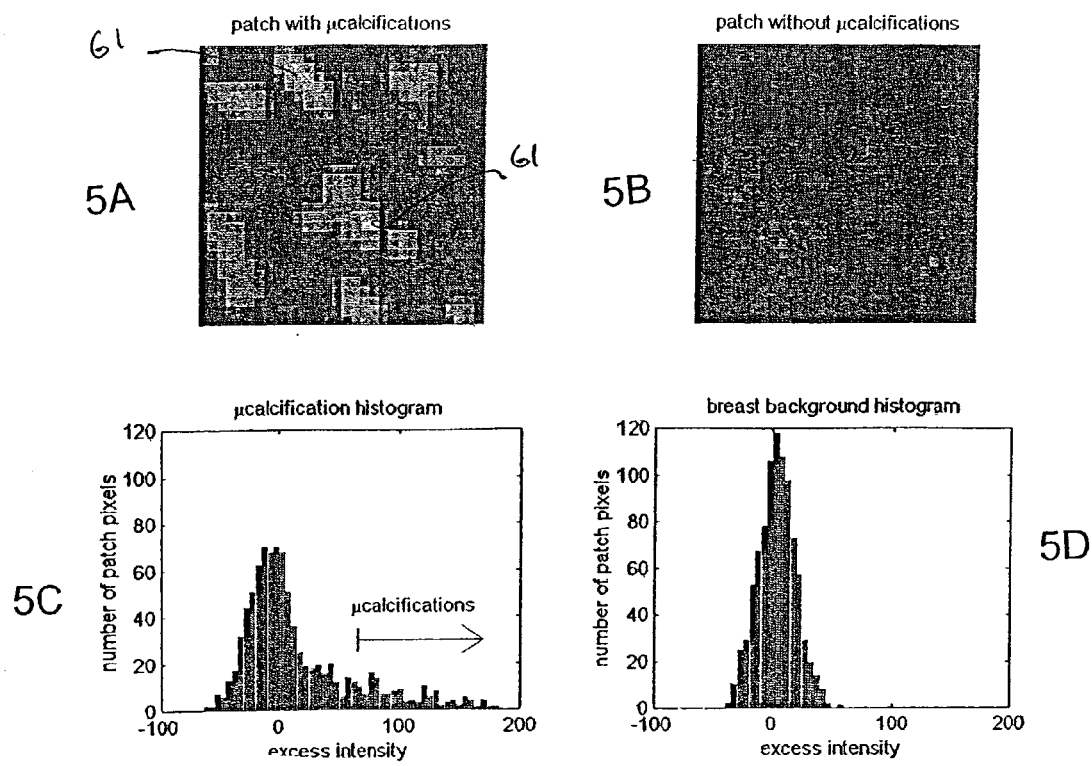
FIG. 5 is a histogram of a plurality of local image patches.

FIG. 5 is a histogram of a plurality of local image patches. FIG. 5a illustrates a local patch of a mastectomy specimen including a plurality of microcalcifications 61. FIG. 5b illustrates a local patch of a mastectomy specimen that does not include microcalcifications 61, i.e. a background breast patch. FIG. 5c is a histogram of the breast patch shown in FIG. 5a, and FIG. 5d is a histogram of the breast patch shown in FIG. 5b. As shown, the intensity histogram shown in FIG. 5c includes a long tail indicated by the arrow on the positive side of the distribution. The pixel intensities indicated by the arrow represent pixel intensity values that correspond primarily to microcalcifications 61. The intensity histogram shown in FIG. 5d, does not include microcalcifications 61, and therefore does not include the tail as shown in FIG. 5c, rather the histogram is approximately unimodal.

Figure 6:
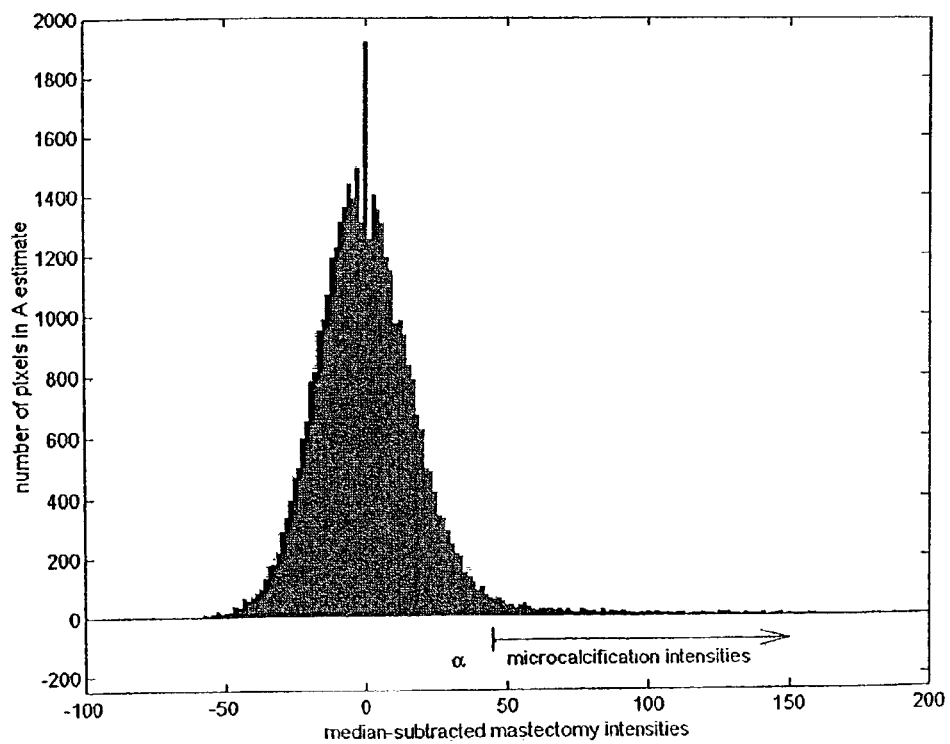
FIG. 6 is histogram of pixel intensities.

FIG. 6 is a histogram of pixel intensities of the mastectomy specimen shown in FIG. 4. As shown in FIG. 6, the pixel intensities indicated by the arrow represent pixel intensity values that correspond primarily to microcalcifications 61.

Method 60 also includes mapping 68 the estimate of pixel intensities due to microcalcification 61, i.e. mapping the A(i, j) estimate intensities such that only the excess intensity due primarily to microcalcifications 61 remains positive. In an exemplary embodiment, mapping 68 can be accomplished using a look-up table.

Figure 7:
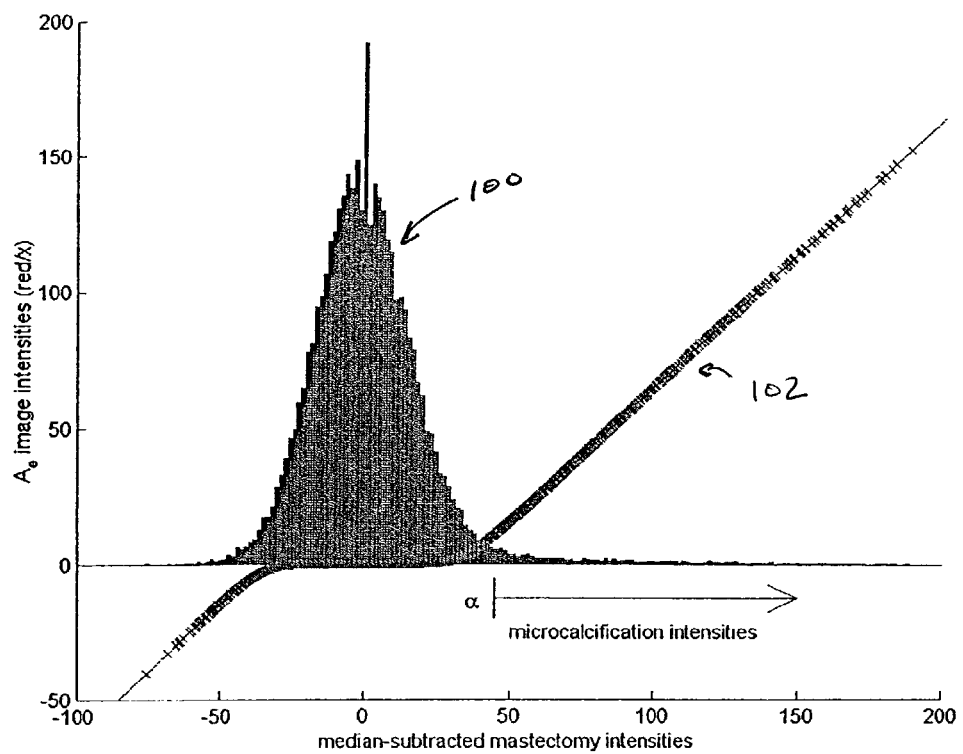
FIG. 7 is histogram of median-subtracted mastectomy intensities.

FIG. 7 is histogram of median-subtracted mastectomy intensities 100. As illustrated, a large area centered about zero corresponds primarily to excess intensity due to a normal variability of background breast tissue, and the tail, indicated by the arrow corresponds primarily to excess intensity due to microcalcifications 61. A curve 102 describes the input/output relationship between median-subtracted mastectomy intensities, and the output intensities, $A_e$. As shown in FIG. 7, an x-axis is an input intensity, i.e. the intensity of first image A, and a y-axis is an output intensity. Therefore, the input excess intensity estimate image, first image A, is remapped using the exemplary look-up to generate an output image $A_e$. In an exemplary embodiment, the look-up table is configured to identify the pixels due to the tail, i.e. which can be considered microcalcifications, and includes a parameter $\alpha$. In an exemplary embodiment, $\alpha$ is selected such that it is an approximate threshold below where an absolute excess intensity in A is set to zero, and above a point in which the excess intensity in A above that threshold is preserved. As shown in FIG. 7, the intensities greater than $\alpha$ correspond primarily to a plurality of locally bright peaks. In one embodiment, a look-up table is variably selected to facilitate removing a fluctuation due to background breast tissue. In an exemplary embodiment, $\alpha$ is a function of the physical and statistical x-ray imaging properties of the breast and the microcalcifications. In at least one known CAD system, the thresholds are computed with neural nets or heuristically, e.g. For example, in some known CAD algorithms, detection parameters are computed in an intensive "training" phase., whereas using the methods described herein, the computation of α is not iterative, nor due to training from example imagery, but a function of physical properties that may be measured in a calibration procedure theoretically without looking at any real imagery.

In an exemplary embodiment, α is a constant in the following energy minimization:

$$A_e = \arg_x \min(\hat{A}-x)^2 + \alpha|x|  \quad \text{Equation 4}$$

In one embodiment, the energy minimization in Equation 4 can be solved using a plurality of half-quadratic minimization techniques to map A intensities to $A_e$ intensities rather than via a look-up table. Accordingly, the $A_e$ image can be computed with a look-up table or an algorithm.

In an exemplary embodiment, because G is nominally an attenuation coefficient-thickness product image, a plurality of statistics of microcalcification sizes, microcalcification compositions, acquisition parameters, noise models and breast density estimates can be used to compute α. Therefore, in an exemplary embodiment, α is a predetermined constant excess intensity threshold. For example, using an input A image, then, the output $A_e$ image's nonzero positive values correspond to local peaks in G or parts of local peaks.

Figure 8:
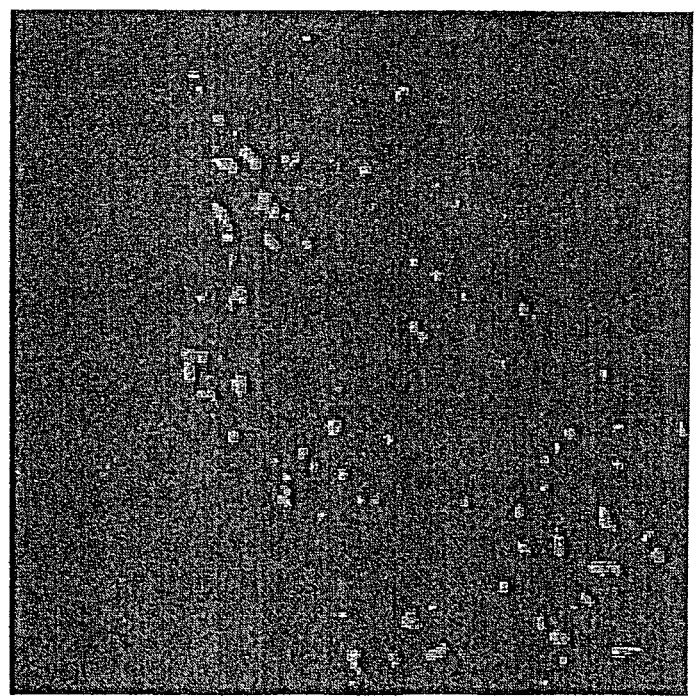
FIG. 8 is a remapped excess intensity image.

FIG. 8 is a remapped excess intensity image corresponding to G in FIG. 3 after processing by subtracting 66 the local background estimate and remapping 68 excess intensity estimates using a look-up table like the one used in FIG. 7.

Combining 70 the mapped estimate of pixel intensities due to microcalcification 61 and the x-ray image to generate an enhanced image facilitates increasing a local contrast of a plurality of local peaks, i.e. microcalcifications 61, while preserving a plurality of the background breast information. In one embodiment, combining 70 the mapped estimates includes combining the mapped estimates using a multiplicative or a Bayesian-based algorithm. In an exemplary embodiment G and $A_e$, are combined by selecting a weighting factor β wherein 0<β<1, for $A_e$, such that an enhanced image, $G_e$, is defined in accordance with:

$$G_e = (1-\beta)G + \beta A_e \quad \text{Equation 5}$$

Figure 9:
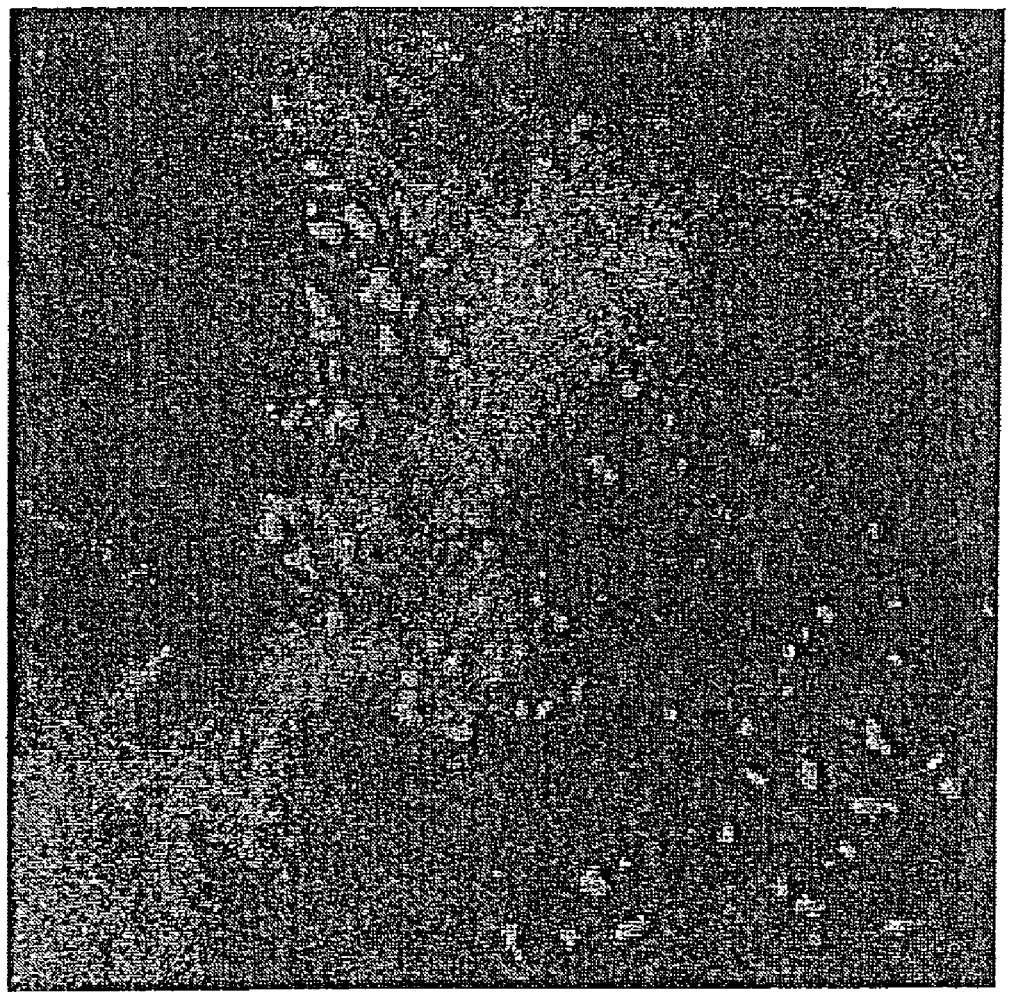
FIG. 9 is an enhanced image generated using the method shown in FIG. 2.

FIG. 9 is an enhanced image $G_e$ generated using the method shown in FIG. 2. In an exemplary embodiment, enhanced image, $G_e$, can be displayed on system 10 or a plurality of images can be transferred to a radiographic film for hard-copy review.

While the invention has been described in terms of various specific embodiments, those skilled in the art will recognize that the invention can be practiced with modification within the spirit and scope of the claims.

What is claimed is:

1. A method for facilitating an enhancement of a visibility of an object in an x-ray image, said method comprising:
generating an x-ray image including at least one object;
generating an estimate of a background surrounding the at least one object;
subtracting the background estimate from the x-ray image to generate an estimate of pixel intensities due the object;
mapping the estimate of pixel intensities due to the object; and
combining the mapped estimate of pixel intensities due to the object and the x-ray image to generate an enhanced image in accordance with:

$$Ge = (1-\beta)G + \beta Ae$$

where:
Ae is a mapped output image;
β is a weighting factor wherein 0<β<1; and
Ge is an enhanced image.

2. A method in accordance with claim 1 wherein said generating an x-ray image comprises generating an x-ray image using at least one of a digitized film screen imagery, a full field digital mammographic (FFDM) imagery, and a tomosynthesis imaging system configured to generate tomosynthesis imagery.

3. A method in accordance with claim 1 further comprising normalizing the x-ray image, said normalized x-ray image comprising an image representation of an attenuation coefficient-thickness product intensity at each pixel in the x-ray image.

4. A method in accordance with claim 1 wherein said object comprises a microcalcification and said x-ray image comprises a thickness-normalized mammographic x-ray image.

5. A method in accordance with claim 1 further comprising decomposing the x-ray image into a first image A and a second image B in accordance with:

$$G(i,j) = \underbrace{\int_{pathlength}\int_{-MC\ energy} \mu_{MC}(x,y,z,E)\,dE\,dp}_{A} + \underbrace{\int_{pathlength}\int_{-breast\ energy} \mu_{breast}(x,y,z,E)\,dE\,dp}_{B}$$

where:

$$A(i,j) = \int_{pathlength}\int_{-MC\ energy} \mu_{MC}(x,y,z,E)\,dE\,dp$$

represents the contributions to pixel intensity from each object; and $$B(i,j) = \int_{pathlength}\int_{-breast\ energy} \mu_{breast}(x,y,z,E)\,dE\,dp$$

represents the contributions to pixel intensity from a background breast tissue.

6. A method in accordance with claim 1 wherein said subtracting the background estimate from the x-ray image to generate an estimate of pixel intensities due the object comprises subtracting the background estimate B in accordance with:

$$A(i,j) = G(i,j) - B(i,j)$$

where:
B(i, j) is an estimate of the local background breast tissue;
G(i, j) is a normalized attenuation coefficient-thickness product x-ray intensity image; and
A(i, j) represents the contributions to pixel intensity from each object.

7. A method in accordance with claim 1 wherein said mapping the estimate of pixel intensities due to the object comprises mapping the estimate of pixel intensities due to the object using at least one of a look-up table and an algorithm, said algorithm comprising an energy minimization algorithm including a plurality of parameters based on imaging physics.

8. A method in accordance with claim 7 wherein said mapping the estimate of pixel intensities using the look-up table comprises mapping the estimate of pixel intensities using the look-up table including a predetermined constant excess intensity threshold to generate an output image Ae, wherein said predetermined constant excess intensity threshold is a function of a physical and a statistical x-ray imaging property of the breast and the objects.

9. A method in accordance with claim 1 wherein said combining the mapped estimate of pixel intensities due to the object and the x-ray image to generate an enhanced image comprises combining the mapped estimate of pixel intensities due to the object and the x-ray image to generate an enhanced image using at least one of a multiplicative algorithm and a Bayesian-based algorithm.

10. A method for facilitating an enhancement of a visibility of a microcalcification in an x-ray image, said method comprising:

generating an estimate of a background surrounding the at least one microcalcification;

decomposing the x-ray image into a first image A and a second image B in accordance with:

$$G(i,j) = \underbrace{\int_{pathlength}\int_{-MC\ energy} \mu_{MC}(x,y,z,E)\,dE\,dp}_{A} + \underbrace{\int_{pathlength}\int_{-breast\ energy} \mu_{breast}(x,y,z,E)\,dE\,dp}_{B}$$

where:

$$A(i,j) = \int_{pathlength}\int_{-MC\ energy} \mu_{MC}(x,y,z,E)\,dE\,dp$$

represents the contributions to pixel intensity from each microcalcification; and $$B(i,j) = \int_{pathlength}\int_{-breast\ energy} \mu_{breast}(x,y,z,E)\,dE\,dp$$

represents the contributions to pixel intensity from a background breast tissue surrounding the microcalcification.

subtracting the background estimate from the x-ray image to generate an estimate of pixel intensities due the microcalcification;

mapping the estimate of pixel intensities due to the microcalcification; and combining the mapped estimate of pixel intensities due to the microcalcification and the x-ray image to generate an enhanced image in accordance with:

$$Ge = (1-\beta)G + \beta Ae$$

where:

Ae is a mapped output image;

$\beta$ is a weighting factor wherein $0<\beta<1$; and

Ge is an enhanced image.

11. A method in accordance with claim 10 wherein said subtracting the background estimate from the x-ray image to generate an estimate of pixel intensities due the microcalcification comprises subtracting the background estimate B in accordance with:

$$A(i,j) = G(i,j) - B(i,j)$$

where:

B(i, j) is an estimate of the local background breast tissue;

G(i, j) is a normalized attenuation coefficient-thickness product x-ray intensity image; and A(i, j) represents the contributions to pixel intensity from each microcalcification.

12. A medical imaging system for facilitating an enhancement of a visibility of an object in an x-ray image, said medical imaging system comprising:

a detector array;

at least one radiation source; and a computer coupled to said detector array and radiation source and configured to:

generate an x-ray image including at least one object;

generate an estimate of a background surrounding the at least one object;

subtract the background estimate from the x-ray image to generate an estimate of pixel intensities due to the object;

map the estimate of pixel intensities due to the object; and combine the mapped estimate of pixel intensities due to the object and the x-ray image to generate an enhanced image in accordance with:

$$Ge = (1-\beta)G + \beta Ae$$

where:

Ae is a mapped output image;

$\beta$ is a weighting factor wherein $0<\beta<1$; and

Ge is an enhanced image.

13. A medical imaging system in accordance with claim 12 wherein to generate an x-ray image, said computer further configured to generate an x-ray image using at least one of a digitized film screen imagery, a full field digital mammographic (FFDM) imagery, and a tomosynthesis imaging system configured to generate tomosynthesis.

14. A medical imaging system in accordance with claim 12 wherein to generate an x-ray image including at least one object, said computer further configured to generate an x-ray image including a plurality of pixel intensities normalized such that pixel intensities are directly proportional to an attenuation-coefficient thickness product of a pathlength traveled by at least one x-ray.

15. A medical imaging system in accordance with claim 12 wherein said computer further configured to decompose the x-ray image into a first image A and a second image B in accordance with:

$$G(i,j) = \underbrace{\int_{pathlength-MC\ energy} \int \mu_{MC}(x,y,z,E)dE\,dp}_{A} + \underbrace{\int_{pathlength-breast\ energy} \int \mu_{breast}(x,y,z,E)dE\,dP}_{B}$$

where:

$$A(i,j) = \int_{pathlength-MC\ energy} \int \mu_{MC}(x,y,z,E)dE\,dp$$

represents the contributions to pixel intensity from each object; and $$B(i,j) = \int_{pathlength-breast\ energy} \int \mu_{breast}(x,y,z,E)dE\,dP$$

represents the contributions to pixel intensity from a background breast tissue.

16. A medical imaging system in accordance with claim 12 wherein to subtract the background estimate from the x-ray image to generate an estimate of pixel intensities due to the object, said computer further configured to subtract the background estimate B in accordance with:

$$A(i,j) = G(i,j) - B(i,j)$$

where:

B(i, j) is an estimate of the local background breast tissue;
G(i, j) is the x-ray image; and
A(i, j) represents the contributions to pixel intensity from each object.

17. A medical imaging system in accordance with claim 12 wherein to map the estimate of pixel intensities due to the object, said computer further configured to map the estimate of pixel intensities due to the object using at least one of a look-up table and an algorithm, said algorithm comprising an energy minimization algorithm based on imaging physics.

18. A medical imaging system in accordance with claim 17 wherein to map the estimate of pixel intensities using the look-up table, said computer further configured to map the estimate of pixel intensities using the look-up table including a predetermined constant excess intensity threshold to generate an output image Ae, wherein said predetermined constant excess intensity threshold is a function of a physical and a statistical x-ray imaging property of the breast and the objects.

19. A medical imaging system in accordance with claim 12 wherein to combine the mapped estimate of pixel intensities due to the object and the x-ray image to generate an enhanced image, said computer further configured to combine the mapped estimate of pixel intensities due to the object and the x-ray image to generate an enhanced image using at least one of a multiplicative algorithm and a Bayesian-based algorithm.

20. A medical imaging system in accordance with claim 12 wherein said object comprises a microcalcification and said x-ray image comprises a thickness-normalized mammographic x-ray image.

21. A computer readable medium encoded with a program executable by a computer for facilitating an enhancement of a visibility of an object in an x-ray image, said program configured to instruct the computer to:
generate an x-ray image including at least one object;
generate an estimate of a background surrounding the at least one object;
subtract the background estimate from the x-ray image to generate an estimate of pixel intensities due to the object;
map the estimate of pixel intensities due to the object; and
combine the mapped estimate of pixel intensities due to the object and the x-ray image to generate an enhanced image in accordance with:

$$Ge = (1-\beta)G + \beta Ae$$

where:
Ae is a mapped output image;
$\beta$ is a weighting factor wherein $0<\beta<1$; and
Ge is an enhanced image.

22. A computer readable medium in accordance with claim 21 wherein to generate an x-ray image, said computer further configured to generate an x-ray image using at least one of a digitized film screen imagery, a full field digital mammographic (FFDM) imagery, and a tomosynthesis imaging system configured to generate tomosynthesis imagery.

23. A computer readable medium in accordance with claim 21 wherein to generate an x-ray image including at least one object, said computer further configured to generate an x-ray image including a plurality of pixel intensities normalized such that the pixel intensities are directly proportional to an attenuation-coefficient thickness product of a pathlength traveled by at least one x-ray.

24. A computer readable medium in accordance with claim 21 wherein said program further configured to decompose the x-ray image into a first image A and a second image B in accordance with:

$$G(i,j) = \underbrace{\int_{pathlength-MC\ energy} \int \mu_{MC}(x,y,z,E)dE\,dp}_{A} + \underbrace{\int_{pathlength-breast\ energy} \int \mu_{breast}(x,y,z,E)dE\,dP}_{B}$$

where:

$$A(i,j) = \int_{pathlength-MC\ energy} \int \mu_{MC}(x,y,z,E)dE\,dp$$

represents the contributions to pixel intensity from each object; and $$B(i, j) = \int_{pathlength-breast} \int_{energy} \mu_{breast}(x, y, z, E) dE dP$$

represents the contributions to pixel intensity from a background breast tissue.

25. A computer readable medium in accordance with claim 21 wherein to subtract the background estimate from the x-ray image to generate an estimate of pixel intensities due the object, said program further configured to subtract the background estimate B in accordance with:

$$A(i, j) = G(i, j) - B(i, j)$$

where:
B(i, j) is an estimate of the local background breast tissue;
G(i, j) is the x-ray image; and
A(i, j) represents the contributions to pixel intensity from each object.

26. A computer readable medium in accordance with claim 21 wherein to map the estimate of pixel intensities due to the object, said program is further configured to map the estimate of pixel intensities due to the object using at least one of a look-up table and an algorithm.

27. A computer readable medium in accordance with claim 21 wherein to map the estimate of pixel intensities due to the object, said program is further configured to map the estimate of pixel intensities due to the object using at least one of a look-up table and an algorithm, said algorithm comprising an energy minimization algorithm including a plurality of parameters based on imaging physics.

28. A computer readable medium in accordance with claim 27 wherein to map the estimate of pixel intensities using the look-up table, said program is further configured to map the estimate of pixel intensities using the look-up table including a predetermined constant excess intensity threshold to generate an output image Ae, wherein said predetermined constant excess intensity threshold is a function of a physical and a statistical x-ray imaging property of a breast and the object.

29. A computer readable medium in accordance with claim 21 wherein to combine the mapped estimate of pixel intensities due to the object and the x-ray image to generate an enhanced image, said program is further configured to combine the mapped estimate of pixel intensities due to the object and the x-ray image to generate an enhanced image using at least one of a multiplicative algorithm and a Bayesian-based algorithm.

30. A method for facilitating an enhancement of a visibility of an object in an x-ray image, said method comprising:

generating an x-ray image including at least one object;
generating an estimate of a background surrounding the at least one object;
subtracting the background estimate from the x-ray image to generate an estimate of pixel intensities due the object by subtracting the background estimate B in accordance with:

$$A(i, j) = G(i, j) - B(i, j)$$

where:
B(i, j) is an estimate of the local background breast tissue;
G(i, j) is a normalized attenuation coefficient-thickness product x-ray intensity image; and
A(i, j) represents the contributions to pixel intensity from each object; mapping the estimate of pixel intensities due to the object; and
combining the mapped estimate of pixel intensities due to the object and the x-ray image to generate an enhanced image.

* * * * *

UNITED STATES PATENT AND TRADEMARK OFFICE
CERTIFICATE OF CORRECTION

| | | |
|---|---|---|
| PATENT NO. | : 7,149,335 B2 | Page 1 of 1 |
| APPLICATION NO. | : 10/256779 | |
| DATED | : December 12, 2006 | |
| INVENTOR(S) | : John Patrick Kaufhold | |

It is certified that error appears in the above-identified patent and that said Letters Patent is hereby corrected as shown below:

STATEMENT REGARDING FEDERALLY SPONSORED
RESEARCH & DEVELOPMENT

Column 1, line 6 insert:

The Government may have certain rights in this invention pursuant to Sub-Contract 22287 under Contract MDA905-00-1-0041 from the Office of Naval Research/Henry M. Jackson Foundation.

Signed and Sealed this

First Day of April, 2008

JON W. DUDAS
*Director of the United States Patent and Trademark Office*